United States Patent [19]

Gay

[11] Patent Number: 5,607,525
[45] Date of Patent: Mar. 4, 1997

[54] METHOD OF MAKING AN AC GENERATOR ROTOR SEGMENT

[75] Inventor: David E. Gay, Noblesville, Ind.

[73] Assignee: General Motors Corporation, Detroit, Mich.

[21] Appl. No.: 308,789

[22] Filed: Sep. 19, 1994

[51] Int. Cl.6 ..................................... B32B 31/26
[52] U.S. Cl. .......................... 156/62.8; 156/89; 156/297; 264/56; 264/63; 264/125; 310/99; 310/263; 29/598
[58] Field of Search .................................... 310/263, 156, 310/44, 42, 46; 148/105, 121; 156/89, 62.2, 62.8, 297; 264/56, 63, 125; 29/598

[56] References Cited

U.S. PATENT DOCUMENTS

| 3,973,153 | 8/1976 | Berney .................................. 310/263 X |
| 4,255,494 | 3/1981 | Reen et al. ............................. 310/44 X |
| 4,588,915 | 5/1986 | Gold et al. ............................. 310/194 |
| 5,004,577 | 4/1991 | Ward ...................................... 264/112 |
| 5,208,503 | 5/1993 | Hisey ..................................... 310/44 X |
| 5,221,503 | 6/1993 | Ward et al. ............................ 264/126 X |
| 5,271,891 | 12/1993 | Gay et al. . |
| 5,382,862 | 1/1995 | Ward et al. ............................. 310/263 |

OTHER PUBLICATIONS

U.S. Ser. No. 08/157452 filed 22–Nov–93, R. W. Ward et al, "Alternating Current Generator Rotor".

Primary Examiner—James Engel
Assistant Examiner—M. Curtis Mayes
Attorney, Agent, or Firm—Lawrence B. Plant

[57] ABSTRACT

End segments of a Lundell-type rotor for an AC generator, wherein the base and the teeth portions thereof are compaction molded separately and subsequently joined together and sintered.

11 Claims, 2 Drawing Sheets

METHOD OF MAKING AN AC GENERATOR ROTOR SEGMENT

FIELD OF THE INVENTION

This invention relates to an alternating current generator rotor of the Lundell type that has a pair of end pole segments formed from compacted and sintered iron powder wherein the segments' pole teeth are compacted independently of the segments' base.

BACKGROUND OF THE INVENTION

Alternating current (AC) generators of the Lundell type are well known to those skilled in the art, and include a core of magnetic material supporting a field coil and a pair of end pole segments each having a plurality of teeth that extend axially from the circumference of the segments' base portion, and that interdigitate with the teeth of the other so as to encircle the coil. One such a rotor is disclosed in Gold et al. U.S. Pat. No. 4,588,915, wherein the pole end segments are formed from sheet steel material and the core is formed as a headed steel part.

Another example of a Lundell-type rotor is disclosed in copending U.S. patent application Ser. No. 08/157,452 filed Nov. 22, 1993 in the names of Ward et al. and assigned to the assignee of the present invention, now U.S. Pat. No. 5,382,862. U.S. Ser. No. 08/157,452, now U.S. Pat. No. 5,382,862, discloses a Lundell type AC generator wherein the core and/or the end pole segments are formed from compacted and sintered ferromagnetic particles (i.e., iron). More specifically in Ward et al., the magnetic components of the rotor are formed by coating iron particles having a particle size in a range of about 10 to 250 microns with a thermoplastic material, and then compacting, or pressing, them to the desired shape at a pressure of about 40 to 50 tons per square inch in a heated mold/die. The thermoplastic material acts as a lubricant during the compacting or pressing operation and as a binder to temporarily hold the particles together in a "green" compact. The green compact is subsequently heated at a temperature of about 2050° F. to remove the binder and sinter the particles together into a cohesive mass. The binder can be removed at a lower temperature followed by subsequently heating the compact to the sintering temperature.

Due to their complex shape, compacting of the end segments, as a single piece, often results in end segments which are not homogeneous, in that they have different densities of material at different locations within the segment. Typically, (1) the base (i.e., central) portion of the segment has densities of about 7.3 g/cc, (2) the teeth have densities which vary from about 7.3 g/cc at their roots to about 7.0 g/cc near their tip, and (3) the transition regions (i.e., between the teeth and the base) have densities greater than about 7.4 g/cc as a result of higher pressures in this region and the coincident forging of the particles thereat. Sharp density gradients, as often occur in the transition region between the base and the tooth, can cause cracking in this region, which weakens the teeth and distorts the flux flow. Nonuniform densities are also undesirable in such end pole segment as they can reduce and distort the flux-carrying capacity of the segment primarily at the teeth. On the other hand, if one were to accept some degree of non-uniform density distribution in the end element, it would be better for the teeth to have the higher densities in order to maximize their flux-carrying capacity.

It is an object of the present invention to provide a Lundell-type AC generator wherein the base and teeth of the rotor's pole end segments are formed from iron particles in separate compaction operations, and subsequently joined and sintered into a cohesive mass having an improved density distribution for improved magnetic performance and durability.

This and other objects and advantages of the present invention will become more readily apparent from the description thereof which follows.

BRIEF DESCRIPTION OF THE INVENTION

The invention contemplates a Lundell-type AC generator rotor, and method of making same, wherein at least one end segment comprises a base portion and a plurality of circumferentially spaced pole teeth extending axially from the circumference of the base portion, wherein the base portion and teeth are formed from sintered iron powder which, prior to sintering, are compacted separately from each other to desired densities for each, and then subsequently joined and bonded together to form the finished segment. As the individual component parts of the segment (i.e., base and teeth) are smaller than the total segment it is possible to achieve higher and more uniform densities in each and upon assembly thereof form a segment whose overall density is higher and more uniform than would be possible by molding the part as one piece. A variety of mechanical joint configurations (e.g., mortise and tenon) are possible to optimize the strength of the joint. Bonding of the teeth to the base may be effected by sintering, brazing or suitable adhesives.

Preferably, both end segments will be made in this fashion using the same materials and to the same density. However, the density of the teeth could be made greater than that of the base to optimize their flux-carrying capacity. In another embodiment, the particles used in the teeth may be provided with different additives or different amounts of the additives to increase their flux-carrying capacity, strength or other properties. Hence for example: (1) small amounts (e.g., ca. 5% by weight) Ni or Co may be alloyed with the iron particles to improve magnetic permeability; (2) small amounts (e.g., ca. 2% by weight) of copper particles may be admixed with the iron particles to improve the strength of the sintered product; (3) small amounts (2.9% by weight) of $Fe_3P$ may be added to the mix to improve strength and permeability; and (4) small amounts (0.1%) of graphite may be added to the mix to improve interstitial strength. Similarly, different lubricants and/or concentrations thereof, as well as different particle sizes and shapes may be used in the base and the teeth in order to obtain different properties in the teeth than in the base.

The base and teeth are compaction molded from iron powder having a thermoplastic binder either blended therewith or coated thereon. Different binders may be used with the base than the teeth as well as different molding temperatures and pressures to achieve the desired properties in the base and the teeth. The molding pressures and temperatures used will vary with the composition of the binder. Finally, the particles may be compacted in a punch-and-die type mold or by utilizing forging, isostatic compaction or other powder compaction techniques as are well known to those skilled in the art.

Once compacted separately, the teeth are bonded to the base portion. This will preferably be done by assembling them together in the "green" (i.e., as molded) state and then sintering the assembly which fuses the iron particles to each other and the teeth to the base. Alternatively, however, the teeth and base may be sintered separately and then adhesively bonded together with brazing alloys, epoxies, cyanoacrylates, silicates, silicones, ceramics, etc.).

DETAILED DESCRIPTION OF CERTAIN EMBODIMENTS OF THE INVENTION

The invention will better be understood when considered in the light of the following detailed description of certain specific embodiments thereof, which is provided hereafter in conjunction with the several figures in which.

Figure 1:
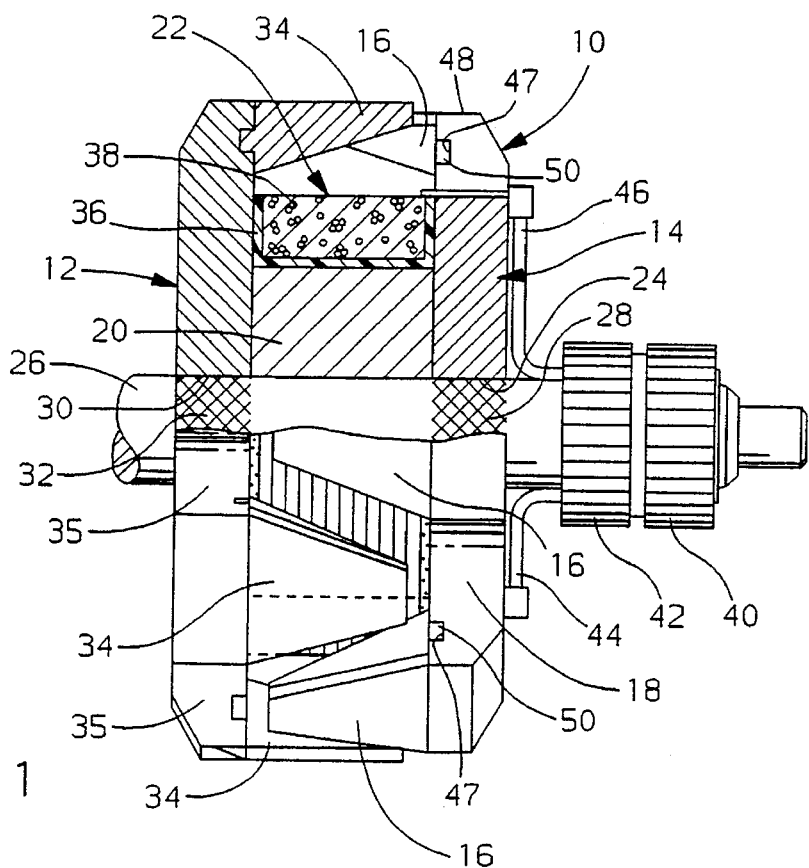
FIG. 1 is a side view, with parts broken away, of a rotor for a Lundell-type AC generator made in accordance with this invention.

FIG. 1 illustrates a Lundell-type rotor for an AC generator. The rotor has two identical end pole segments 10 and 12 respectively. Segment 10 is shown in the exploded, perspective view of FIG. 2, and has a base portion 14, a central bore 24 therein, and six circumferentially spaced pole teeth 16 extending axially from the perimeter thereof. The teeth 16 are separated from each other by notches 18, and are initially separate from the base 14, as will be discussed in more detail hereinafter. The rotor has a cylindrical core portion 20 that extends between the end segments 10 and 12, and that carries a field coil 22 thereabout which, in turn, is encircled by the teeth 16 from the end segment 10. The field coil 22 assembly comprises a spool 36 that is formed of electrical insulating material and carries a field winding 38 comprising a plurality of turns of wire which serves to generate magnetic flux in the rotor as is well known in the art. The core 20 and pole end segments 10 and 12 form a magnetic circuit for carrying and appropriately concentrating the magnetic flux. The opposite ends of field winding 38 are electrically connected to metallic slip rings 40 and 42 by conductors 44 and 46. The slip rings 40 and 42 are carried by rotor shaft 26 and are electrically insulated from the shaft, and each other, in a manner known to those skilled in the art.

The bore 24 of segment 10 is secured to the shaft 26 by pressing it onto a knurled portion 28 formed thereon. Similarly, the segment 12 has a central bore 30 secured to shaft 26 by knurled portion 32. Like segment 10, the segment 12 has six circumferentially spaced pole teeth 34 that are separated by notches 35. The pole teeth 16 of end segment 10 are interdigitated with the pole teeth 34 of the end segment 12 (i.e., disposed between one another as shown in FIG. 1) so as to encircle the field coil 22.

The bases and teeth of the segments 10 and 12 are formed of small (i.e., ca. 10 microns to ca. 250 microns) iron or iron alloy particles mixed with suitable thermoplastic binders and molding lubricants. Preferably from a manufacturing simplicity standpoint, the composition of the particle mix as well as the processing parameters therefor used to make both the base and the teeth will be the same. However, in some circumstances, it may be desirable to use different iron alloys, or different particle compositions, in the teeth than in the base. For example, it may be desirable for the teeth to have more flux-carrying capacity than the base. Hence, it may be desirable to alloy a small amount (ca. 1% to 5%) of Ni with the iron in the teeth to improve their flux-carrying ability, or a small amount (ca. 1% to 3%) of Cu to improve strength. Alternatively, it may be desirable to employ different iron particle sizes, binders and/or lubricants in order to achieve higher densities in the teeth than in the base to likewise provide enhanced flux-carrying properties in the teeth.

By way of example and not by way of limitation, the iron powder particles used to make the subject end segments, may be a Hoeganaes 1000 B-PF iron powder which is blended with (1) a small amount (i.e., ca. 0.1% to ca. 1.0% by weight) of a fugitive binder, such as polyphenylene oxide (e.g., GE's Noryl), (2) a lubricant such as Carbowax, and (3) a strengthener such as $Fe_3P$. The particle sizes of the iron particles range from about 10 microns to 250 microns with the majority of the particles being larger than about 44 microns. The iron alloy comprises about 99.7% Fe, 0.003% C, 0.0005% N, 0.006% S and 0.004% P. One particularly effective such blend, employing an unknown binder, is sold by the Hoeganaes Corporation under the trade name ANCHORDENSE™ and described in Semel U.S. Pat. No. 4,834,800 issued May 30, 1989 and assigned to the Hoeganaes Corporation. Hoeganaes 1000 C, or Hoeganaes SC 40 are likewise useful iron particles for this purpose when mixed with appropriate lubricants and binders.

Alternatively, the mixture to be compacted/sintered may comprise iron particles which have previously been coated with a fugitive binder (e.g., polyphenylene oxide) such as described in U.S. Pat. No. 5,271,891, issued Dec. 21, 1993 in the names of D. E. Gay et al, and assigned to the assignee of the present invention. One way of coating the particles is to dissolve the thermoplastic in a solvent to form a solution thereof. The iron particles are then blown upwardly through a vertical tube while, at the same time, the binder solution is sprayed into the tube to coat the particles. The solvent evaporates leaving the thermoplastic binder on the surface of the particles. The coated particles fall outside of the tube, and are repeatedly recirculated upwardly through the tube where they are coated again and again until a desired thickness of binder is achieved.

In accordance with the present invention, the base portion and teeth are formed in separate compaction operations followed by bonding them together to form the finished segment. In this regard, a quantity of the binder-containing iron powder is fed into a molding die in a suitable press. The shape of the die is configured to provide the shape of either the base 14 or a tooth 16, as appropriate. When polyphenylene oxide binders are used, the iron powder is preheated to about 290° F. before being introduced into the die, while the die itself is preheated to about 550° F. When other binders are used, different particle and die temperatures are required depending on the thermoplastic used. Hence, for example, when ANCHORDENSE™ particles are used the mold is only heated to about 350° F. The particles are compressed in the die at a pressure of about 50 to 55 tons per square inch for about 6 to 12 seconds in order to obtain densities of at least 7.4 g/cc (i.e., for both the base portion and the teeth). During compaction molding, the thermoplastic operates as a lubricant and serves to increase the density of the molded base/tooth. Upon cooling, the thermoplastic acts as a binder and serves to hold the particles together in the as-molded, "green" state.

In a preferred embodiment of the invention, the as-molded (green) teeth 16 are joined to the as-molded (green) base 14 after they have been molded, but before sintering. Thereafter, the segment (i.e., assembled base and teeth) is heated to a temperature of about 2050° F., and held there for about 15 to 45 minutes to sinter the particles together into a cohesive mass of sintered iron particles devoid any residual binder, and concurrently bond the teeth to the base. The thermoplastic binder material is burned-off prior to or during the sintering operation.

Alternatively after compaction molding, the base 14 and teeth 16 may be sintered separately, and thereafter subsequently joined and bonded together utilizing an intermediate bonding agent or adhesive such as, for example, brazing alloys, epoxies, cyanoacrylates, silicates, silicones, ceramics, etc. Likewise, the teeth could be sintered first then joined to the unsintered base, and bonded to the base as it sinters.

Figure 2:
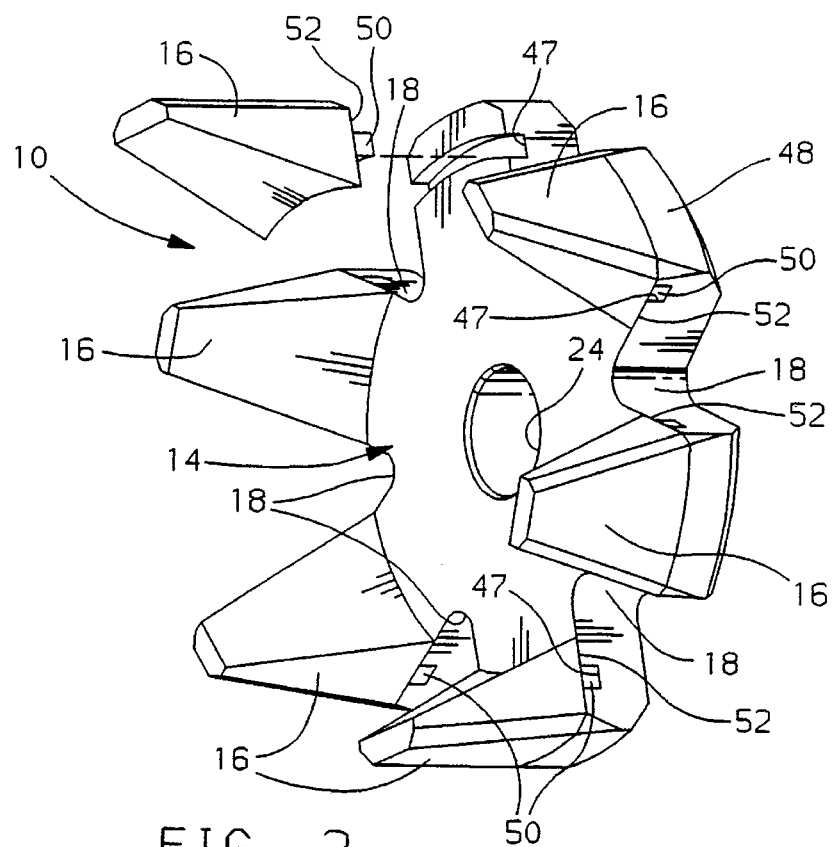
FIG. 2 is a perspective and exploded view of one of the end segments of the rotor shown in FIG. 1.
Figure 3:
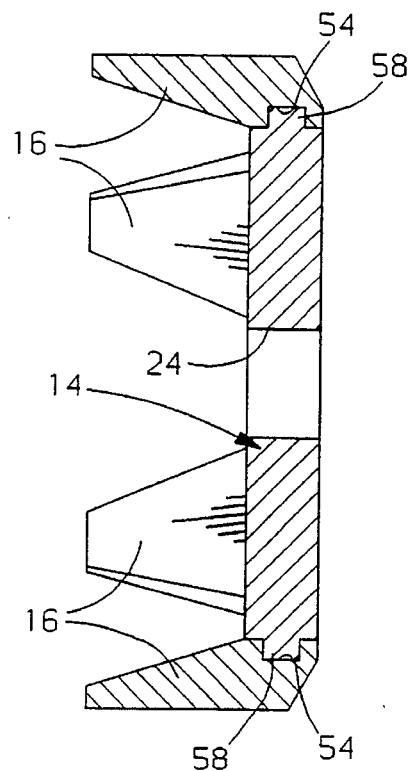
FIGS. 3–6 are side sectioned views of alternative embodiments of the base-tooth joints in rotor end segments made in accordance with the present invention.
Figure 4:
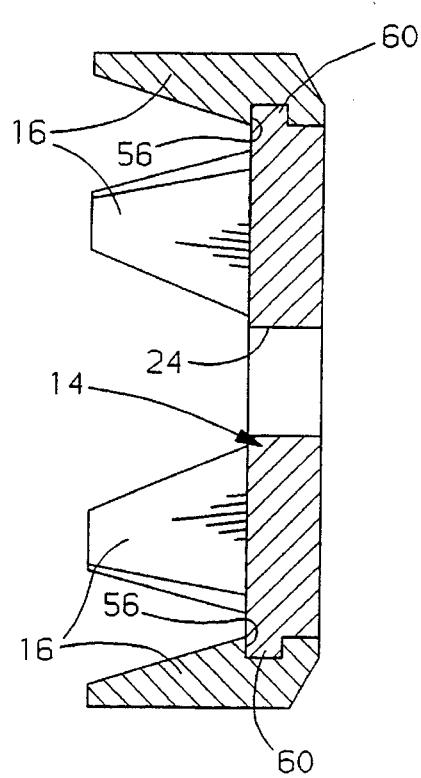
Figure 5:
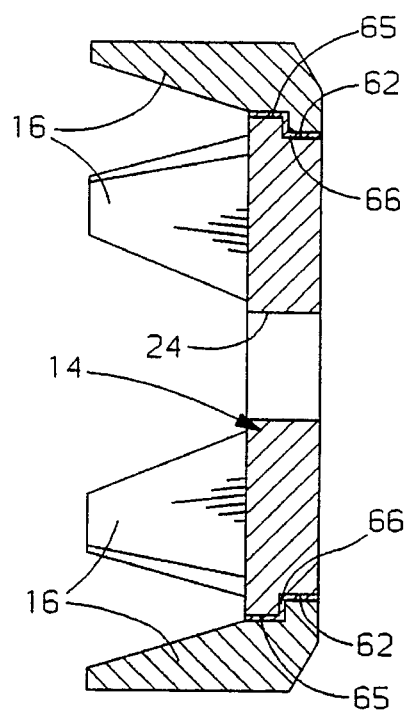
Figure 6:
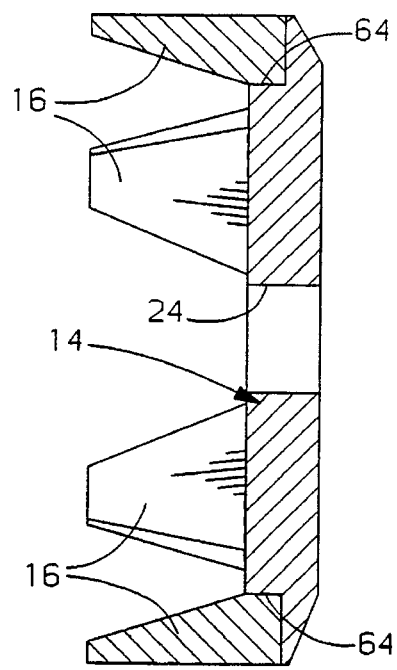

FIGS. 2–6 show various configurations of mechanical joints between the several teeth 16 and the base 14 to facilitate alignment/positioning of the components and provide a strong joint therebetween. FIGS. 2–4 show various mortise-and-tenon type joints. In FIG. 2, the base 14 has a mortise 47 inboard its periphery 48 while the teeth 16 each have a tenon 50 at the roots 52 thereof. In FIGS. 3 and 4, mortises 54 and 56 respectively are formed in the roots of the teeth 16, and mating tenons 58 and 60 on the base 14 mate with the mortises 54 and 56. In FIGS. 5 and 6, bases 14 have rabbets 62 and 64 formed on the peripheries thereof for receiving complementarily-shaped roots of the teeth 16. The stepped configuration of the rabbet 62 of FIG. 5 is particularly desirable as it provides a relatively large surface area 65 between the teeth 16 and base 14 for improved strength when bonding agents 66 are used.

While the invention has been disclosed primary in terms of specific embodiments thereof, it is not intended to be limited thereto but rather only to the extent set forth hereafter in the claims which follow.

The embodiments of the invention in which an exclusive property or privilege is claimed is defined as follows:

1. A method of making an end pole segment for a rotor of an alternating current generator said end segment being formed from a ferromagnetic material and comprising a base portion and a plurality of circumferentially spaced teeth axially extending from said base portion comprising the steps of:

compacting a first mixture of ferromagnetic particles and a fugitive binder at a first temperature and pressure to form a first compact having a first density and conforming substantially to said base;

compacting a second mixture of ferromagnetic particles and a fugitive binder at a second temperature and pressure to form a plurality of second compacts having a second density and conforming substantially to said teeth;

bonding said second compacts to said first compact;

removing said binder; and sintering said compacts to bond said particles together into a cohesive mass and form said segment with said teeth having a flux-carrying capability at least equal to that of said base.

2. A method according to claim 1 wherein said first and second compacts are sintered before being bonded together.

3. A method according to claim 1 wherein said first and second compacts are joined together before sintering, and bonded each to the other during said sintering.

4. A method according to claimi 3 wherein said first and second compacts are bonded together by said sintering.

5. A method according to claim 1 wherein said second density is at least as high as said first density.

6. A method according to claim 1 wherein said binder is admixed with said particles.

7. A method according to claim 1 wherein said particles are encapsulated by said binder.

8. A method according to claim 1 wherein said binder is a thermoplastic material.

9. A method of making an end pole segment for a rotor of an alternating current device said end segment being formed from a ferromagnetic material and comprising a base portion and a plurality of circumferentially spaced teeth axially extending from said base portion comprising the steps of:

compacting a first mixture of ferromagnetic particles and a fugitive binder at a first temperature and pressure to form a first compact having a first density and conforming substantially to said base;

compacting a second mixture of ferromagnetic particles and a fugitive binder at a second temperature and pressure to form a plurality of second compacts having a second density greater than said first density and conforming substantially to said teeth;

bonding said second compacts to said first compact;

removing said binder; and sintering said compacts to bond said particles together into a cohesive mass.

10. A method of making an end pole segment for a rotor of an alternating current device said end segment being formed from a ferromagnetic material and comprising a base portion and a plurality of circumferentially spaced teeth axially extending from said base portion comprising the steps of:

compacting a first mixture of ferromagnetic particles and a fugitive binder at a first temperature and pressure to form a first compact having a first density and conforming substantially to said base;

compacting a second mixture of ferromagnetic particles and a fugitive binder at a second temperature and pressure to form a plurality of second compacts having a second density and conforming substantially to said teeth, said second mixture having a different composition than said first mixture;

bonding said second compacts to said first compact;

removing said binder; and sintering said compacts to bond said particles together into a cohesive mass.

11. A method according to claim 10 wherein said second mixture includes ingredients which enhance the flux-carrying capacity of the teeth over that of the base.

* * * * *